United States Patent
Sung

(10) Patent No.: US 12,552,377 B2
(45) Date of Patent: Feb. 17, 2026

(54) METHOD AND A DEVICE FOR CONTROLLING AN ADAS BASED ON THE LOAD AND THE SLOPE OF A DRIVING VEHICLE

(71) Applicant: HL Klemove Corp., Incheon (KR)

(72) Inventor: Ki Bum Sung, Incheon (KR)

(73) Assignee: HL Klemove Corp., Incheon (KR)

( * ) Notice: Subject to any disclaimer, the term of this patent is extended or adjusted under 35 U.S.C. 154(b) by 23 days.

(21) Appl. No.: 18/762,761

(22) Filed: Jul. 3, 2024

(65) Prior Publication Data
US 2025/0282351 A1    Sep. 11, 2025

(30) Foreign Application Priority Data
Mar. 11, 2024 (KR) .......................... 10-2024-0033885

(51) Int. Cl.
*B60W 30/14* (2006.01)
*B60W 40/076* (2012.01)
*B60W 50/14* (2020.01)

(52) U.S. Cl.
CPC .......... *B60W 30/14* (2013.01); *B60W 40/076* (2013.01); *B60W 50/14* (2013.01); *B60W 2050/143* (2013.01); *B60W 2552/15* (2020.02); *B60W 2720/106* (2013.01)

(58) Field of Classification Search
CPC .... B60W 30/14; B60W 40/076; B60W 50/14; B60W 2552/15; B60W 2050/143; B60W 2720/106
See application file for complete search history.

(56) References Cited

U.S. PATENT DOCUMENTS

2005/0240334 A1\* 10/2005 Matsumoto ........ B60K 31/0066
701/96

FOREIGN PATENT DOCUMENTS

| JP | 2005023916 A | \* | 1/2005 | |
| KR | 101410259 B1 | \* | 6/2014 | .......... B60W 40/076 |

OTHER PUBLICATIONS

English Machine Translation KR-101410259-B1 (Year: 2014).\*
English Machine Translation JP-2005023916-A (Year: 2005).\*

\* cited by examiner

*Primary Examiner* — Andrew J Cromer
(74) *Attorney, Agent, or Firm* — Harvest IP Law, LLP

(57) ABSTRACT

The present disclosure relates to a method and a device for controlling an advanced driver-assistance system (ADAS) based on the load and the slope of a driving vehicle. The method may include calculating information on the load of the driving vehicle; transmitting a required acceleration while controlling an adaptive cruise control of the driving vehicle; comparing the time required to reach the required acceleration with the time required to reach an actual acceleration of the driving vehicle; transmitting a warning signal about overload to a driver based on the reaching time; calculating information on the slope on which the driving vehicle is traveling; and controlling the adaptive cruise control based on the information on the slope of the driving vehicle.

14 Claims, 5 Drawing Sheets

METHOD AND A DEVICE FOR CONTROLLING AN ADAS BASED ON THE LOAD AND THE SLOPE OF A DRIVING VEHICLE

TECHNICAL FIELD

The present disclosure relates to a method and a device for controlling an advanced driver-assistance system (ADAS) based on the load and the slope of a driving vehicle, and, more particularly, to a method and a device for controlling the ADAS of a driving vehicle by comparing a required acceleration and an actual acceleration while controlling the adaptive cruise control (ACC) of the driving vehicle.

BACKGROUND

The ACC is an active safety system that automatically controls acceleration and braking of a vehicle, allowing the driver of the vehicle to drive safely.

In keeping with the advancement of the ACC, there is a need to discuss technologies for operating the ACC more efficiently in specific scenarios.

SUMMARY

The present disclosure has been made in an effort to detect overload and prevent accidents resulting therefrom by checking the acceleration followability required by the ACC to determine whether a vehicle is overloaded while controlling the ACC and adjusting the overload alarm, the ACC responsiveness, the time when the AEB alarm sounds, and the time when the LKAS alarm sounds when determining that the vehicle is overloaded.

According to some embodiments of the present disclosure, a method of controlling an advanced driver-assistance system (ADAS) based on the load and the slope of a driving vehicle may include calculating information on the load of the driving vehicle; transmitting a required acceleration while controlling an adaptive cruise control of the driving vehicle; comparing the time required to reach the required acceleration with the time required to reach an actual acceleration of the driving vehicle; transmitting a warning signal about overload to a driver based on the reaching time; calculating information on the slope on which the driving vehicle is traveling; and controlling the adaptive cruise control based on the information on the slope of the driving vehicle.

According to an embodiment of the present disclosure, the transmitting of the warning signal about overload to the driver based on the reaching time may include providing the warning signal about overload to the driver when the reaching time exceeds a reference value.

According to an embodiment of the present disclosure, as the difference between the reaching time and the reference value increases, more warning signals about overload may be provided.

According to an embodiment of the present disclosure, the controlling of the adaptive cruise control based on the information on the slope of the driving vehicle may include increasing the required acceleration when the driving vehicle is determined to be going uphill based on the information on the slope thereof.

According to an embodiment of the present disclosure, the controlling of the adaptive cruise control based on the information on the slope of the driving vehicle may further include lowering the required acceleration when the driving vehicle is determined to be going downhill or on a flat surface based on the information on the slope thereof.

According to an embodiment of the present disclosure, the controlling of the adaptive cruise control based on the information on the slope of the driving vehicle may further include controlling an AEB alarm to sound earlier than a preset time when the driving vehicle is determined to be going downhill or on a flat surface based on the information on the slope thereof.

According to an embodiment of the present disclosure, the controlling of the adaptive cruise control based on the information on the slope of the driving vehicle may further include controlling the AEB alarm to sound earlier when the driving vehicle is determined to be going downhill based on the information on the slope thereof, compared to when the driving vehicle is determined to be traveling on a flat surface based on the information on the slope thereof.

According to the present disclosure, it may be possible to detect overload and prevent accidents resulting therefrom by checking the acceleration followability required by the ACC to determine whether a vehicle is overloaded while controlling the ACC and adjusting the overload alarm, the ACC responsiveness, the time when the AEB alarm sounds, and the time when the LKAS alarm sounds when determining that the vehicle is overloaded.

DETAILED DESCRIPTION

Figure 1:
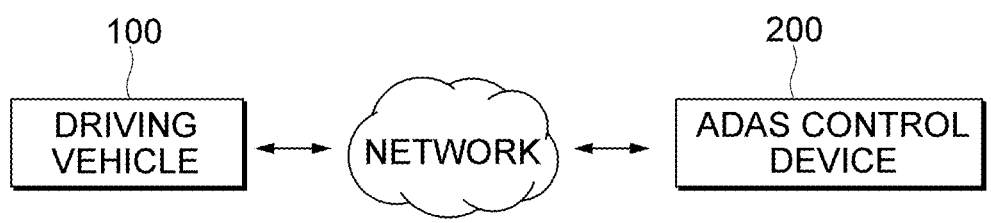
FIG. 1 illustrates an example of an environment where an ADAS control device according to some embodiments of the present disclosure can be applied.

Hereinafter, the desirable embodiments of the present disclosure will be described in detail with reference to the attached drawings. The advantages and features of the present disclosure and the methods for achieving them will be clearly understood by the following embodiments described in detail with reference to the drawings. However, the technology of the present disclosure is not limited to the following embodiments and may be carried out in various forms. The following embodiments are merely provided to complete the technology of the present disclosure and allow a person having ordinary skill in the art to fully understand the scope of the present disclosure, and the technology of the present disclosure is defined only by the scope of the claims.

It should be noted that, when assigning drawing reference numbers to the components in each drawing, identical components have been given the same reference number whenever possible, even if they are in different drawings. In addition, with regard to the description of the present disclosure, when it is determined that a detailed description of a certain well-known component or function may obscure the gist of the present disclosure, the detailed description will not be provided.

Unless otherwise defined, all terms herein, including technical and scientific terms, have meanings commonly understood by a person having ordinary skill in the technical field to which the present disclosure pertains. In addition, terms defined in commonly used dictionaries should not be interpreted in an ideal or excessive sense, unless specifically defined. The terms used herein are not intended to limit the present disclosure, but to describe the embodiments thereof. In the present disclosure, expressions in the singular form include the meaning of the plural form unless specifically mentioned therein.

Furthermore, to describe the components of the present disclosure, terms such as "first," "second," "A," "B," "(a)," and "(b)" may be used. Such a term is only used to distinguish a component from another component, and does not limit the nature, sequence, etc. of the component. When a component is described as being "connected" or "coupled" to another component, the component may be directly connected to the other component, or there may be other "connected" or "coupled" components therebetween.

The expression "comprise" and/or "comprising" used to describe a component, step, operation, and/or element herein does not exclude the presence or the possibility of the addition of one or more other components, steps, operations, and/or elements.

Hereinafter, the various embodiments of the present disclosure will be described in detail with reference to the attached drawings.

Furthermore, to describe the components of the present disclosure, terms such as "first," "second," "A," "B," "(a)," and "(b)" may be used. Such a term is only used to distinguish a component from another component, and does not limit the nature, sequence, etc. of the component. Throughout the specification, when a certain part is described as "including" or "having" a certain component, it does not mean that other components are excluded, but that the part may further include other components, unless specifically described to the contrary. In addition, terms such as "unit" and "module" used herein refer to a unit that processes at least one function or operation, which may be in the form of hardware, software, or a combination of hardware and software.

FIG. 1 illustrates an example of an environment where an ADAS control device according to some embodiments of the present disclosure can be applied. Through the system in FIG. 1 including a driving vehicle 100 and an ADAS control device 200, it may be possible to control an adaptive cruise control (ACC) based on the amount of cargo loaded on the driving vehicle 100 and the slope on which the driving vehicle 100 runs.

Hereinafter, the operations of the components in FIG. 1 related to the control of the ACC of the driving vehicle 100 through the above-described system will be described in more detail.

FIG. 1 shows how the driving vehicle 100 and the ADAS control device 200 are connected through a network, which is only for convenience of understanding, and the number of devices that can be connected to the network can vary.

Meanwhile, FIG. 1 only shows a desirable embodiment for achieving the purpose of the present disclosure, and some components may be added or deleted as needed. Hereinafter, the components shown in FIG. 1 will be described in more detail.

The ADAS control device 200 may collect and analyze various information from the driving vehicle 100. The various information may include all data generated from the driving vehicle 100, such as the speed of the driving vehicle, the wheel angle of the steering device, and the specifications of the driving vehicle itself, and may also include information on the environment in which the driving vehicle is running. Such information may be information collected through a series of devices in the driving vehicle 100 while the driving vehicle 100 is traveling, and it is needless to say that a person having ordinary skill in the art can understand that the series of devices may include all electronic devices of the driving vehicle 100. In addition, such information may include information collected when the vehicle is stopped, rather than information collected while the vehicle is driving.

The "ADAS," as described above herein, is an abbreviation for "advanced driver assistance system," and may refer to all functions that help drivers drive safely and conveniently, rather than a specific function. In other words, the "ADAS" is a general term for advanced driver assistance systems that are useful in diverse environments in which vehicles drive.

In addition, the smart cruise control (SCC) or adaptive cruise control (ACC) of a driving vehicle, as described above herein, may use radar serving as a sensor for scanning the front view to detect other vehicles, objects, etc. around the vehicle, and may control the deceleration and acceleration of the vehicle in order to follow the target speed to maintain an appropriate distance from another vehicle ahead. That is, it refers to an automatic driving system that prevents accidents by automatically reducing the speed of the driving vehicle.

The driving vehicle 100 in FIG. 1 may be not only a vehicle equipped with autonomous driving technology, but also a vehicle without autonomous driving technology. Examples of the driving vehicle 100 may include both a four-wheeled vehicle and a two-wheeled motorcycle.

In order to avoid repeating the same description, various operations performed by the ADAS control device 200 will be described in more detail below with reference to FIG. 2 and the following drawings.

Meanwhile, the ADAS control device 200 may operate through one or more computing devices. For example, all functions of the ADAS control device 200 may be performed by a single computing device. For another example, a first function of the ADAS control device 200 may be performed by a first computing device, and a second function thereof may be performed by a second computing device. Here, the computing devices may be a laptop computer, a desktop computer, etc., not limited thereto, and may also be all types of devices with computing functions. However, it may be desirable for the ADAS control device 200 to be operated through a computing device with a high-performance server. An example of the computing device will be described with reference to FIG. 5.

In addition, additional functions that can be performed by the ADAS control device 200 may be performed by electronic devices installed in the driving vehicle 100. Therefore, although the ADAS control device 200 and the driving vehicle 100 are shown separately in FIG. 1, it goes without saying that the ADAS control device 200 may be installed in the driving vehicle 100 according to one embodiment of the present disclosure so that corresponding devices in the driving vehicle 100 may perform the first function, the second function, etc. Accordingly, it should be noted that the present disclosure is not limited the embodiment where the driving vehicle 100 and the ADAS control device 200 are physically separated as shown in FIG. 1.

In the present disclosure, for convenience of description, an example in which the driving vehicle 100 and the ADAS control device 200 perform their respective functions separately will be described.

According to some embodiments of the present disclosure, components in an environment where the ADAS control device 200 is applied may communicate with each other through a network. Examples of the network may include all types of wired/wireless networks such as the local area network (LAN), the wide area network (WAN), the mobile radio communication network, and the wireless broadband internet (Wi-bro).

Meanwhile, in the environment in FIG. 1, the driving vehicle 100 and the ADAS control device 200 are connected via a network, but the scope of the present disclosure is not limited thereto. It should be noted that the driving vehicle 100 may also be connected to the ADAS control device 200 in a peer-to-peer (P2P) manner.

With reference to FIG. 1, an example of an environment in which the corresponding device 200 according to some embodiments of the present disclosure can be applied has been described. Hereinafter, with reference to FIG. 2 and the following drawings, the methods according to the various embodiments of the present disclosure will be described in detail.

Each step of the methods to be described below may be performed by a computing device. In other words, each step of the methods may include one or more instructions executed by a processor of a computing device. All steps of such methods may be performed by a single physical computing device, or first and second steps of the methods may be performed by a first computing device and a second computing device, respectively.

Hereinafter, with reference to FIG. 2, the description will be continued assuming that each step of the methods is performed by the ADAS control device 200 in FIG. 1. However, for convenience of description, the subject performing each step of the methods may not be described.

Figure 2:
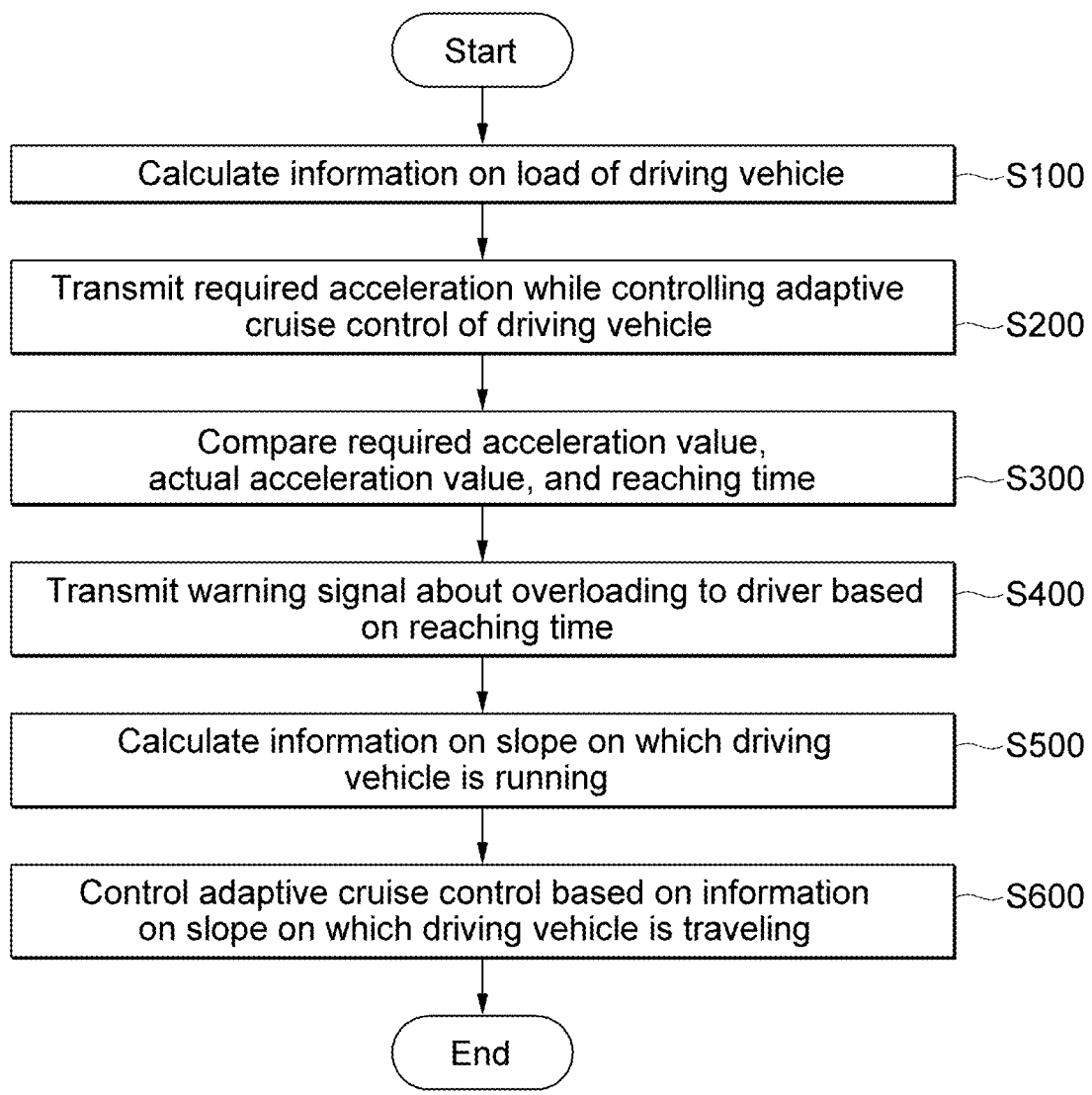
FIG. 2 is a flowchart for showing the operation of controlling the adaptive cruise control of a driving vehicle based on information on the load of the driving vehicle that can be obtained by the ADAS control device according to some embodiments of the present disclosure.

FIG. 2 is a flowchart for showing the operation of controlling the adaptive cruise control of the driving vehicle based on information on the load of the driving vehicle that can be obtained by the ADAS control device according to some embodiments of the present disclosure.

At S100, the ADAS control device 200 may calculate information on the load of the driving vehicle 100. The information on the load may refer to information on the weight of cargo loaded on the driving vehicle 100. Accordingly, the information on the load may include information on the number, weight, type, material, etc. of cargo loaded on the driving vehicle 100. In addition, the information on the load may include information on acceleration followability tendency based on the amount of cargo loaded on the driving vehicle 100. More specifically, the information on acceleration followability tendency may include information on a tendency to reach a certain acceleration when cargo is loaded or a certain amount of cargo is loaded on the driving vehicle 100, which is based on data on the time taken to reach a specific acceleration when the driving vehicle 100 is not loaded with cargo, the time taken to reach the specific acceleration under the same conditions when a certain amount of cargo is loaded, etc. For example, the information on the load may include information on time c, which is a reference time taken to reach a specific acceleration or a required acceleration when a kg of cargo has been loaded on driving vehicle A.

At S200, the ADAS control device 200 may transmit a required acceleration while controlling the adaptive cruise control of the driving vehicle. That is, at S200, while controlling the adaptive cruise control of the driving vehicle, the ADAS control device 200 may calculate how much acceleration is currently required for the driving vehicle 100, based on information on the speed of the driving vehicle 100 set by the occupant of the driving vehicle 100 and information on the speed at which the driving vehicle 100 is currently traveling.

At S300, the ADAS control device 200 may calculate the values of a required acceleration and the actual acceleration of the driving vehicle and calculate the time required to reach the required acceleration. Because the value of the actual acceleration may be changed depending on information on the amount of cargo loaded on the driving vehicle 100 or the slope on which the driving vehicle 100 is traveling, at S300, the ADAS control device 200 may calculate the time required to reach the required acceleration based on the difference between the actual acceleration value and the required acceleration value.

At S400, the ADAS control device 200 may transmit a warning signal about overloading to the driver based on the time required to reach the required acceleration. That is, when the time required to reach the required acceleration exceeds a certain reference time, the ADAS control device 200 may determine that the driving vehicle 100 is overloaded and provide a warning signal about overloading to the occupants through the driving vehicle 100. Here, the information on the certain reference time may be included in the information on the load described above in relation to S100. Hereinafter, a specific example will be described in more detail with reference to FIG. 3.

Figure 3:
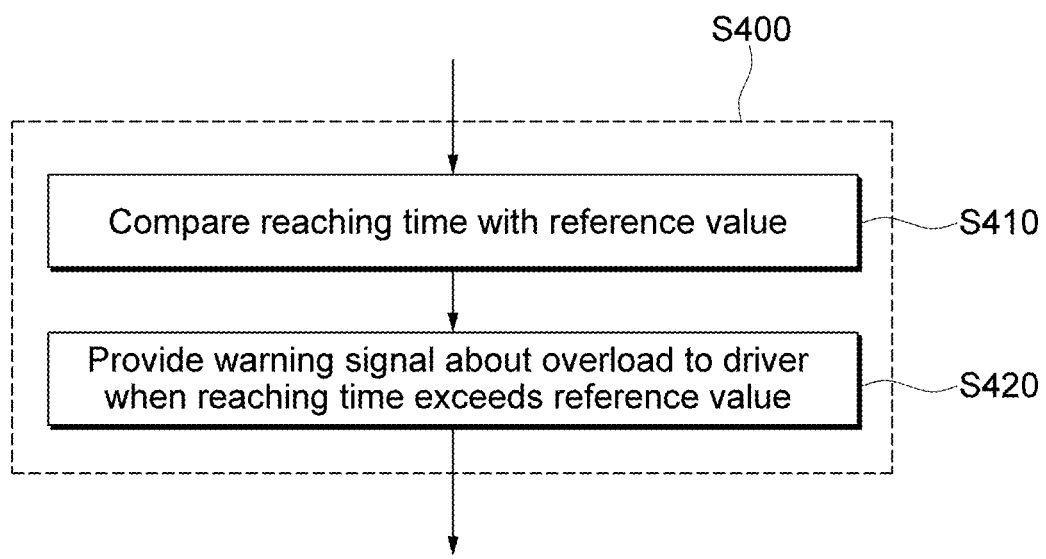
FIG. 3 is a flowchart for specifically describing the steps of transmitting a warning signal about overload to a driver based on the time required to reach a required acceleration according to some embodiments of the present disclosure.

FIG. 3 is a flowchart for specifically describing the steps of transmitting a warning signal about overload to the driver based on the time required to reach the required acceleration according to some embodiments of the present disclosure.

At S410, the ADAS control device 200 may compare the time required to reach the required acceleration with a reference value. The ADAS control device 200 may compare a preset reference time and the time required to reach the required acceleration to calculate the difference therebetween.

At S420, the ADAS control device 200 may provide a warning signal about overload to the driver when the time required to reach the required acceleration exceeds a reference value. As the difference increases, the ADAS control device 200 may provide more alarms about overload to the driver or turn up the volume of the alarm.

Alternatively, as the difference increases, the ADAS control device 200 may provide the warning signal about overload to the driver through more routes by using one or more display electronic devices. For example, as the difference increases, the ADAS control device 200 may provide the warning signal about overload in parallel to the head-up display (HUD), the main display, etc. of the driving vehicle 100.

In addition, when the warning signal about overload is provided to the driver, at S420, the ADAS control device 200 may increase the degree of overall control of the ADAS of the driving vehicle 100 by adding a function for controlling lateral acceleration to the functions of the adaptive cruise control. For example, the ADAS control device 200 may calculate information on the lateral acceleration of the driving vehicle 100 before a certain period of time has elapsed after providing the warning signal about overload to the driver, and may reset the degree of overall control of the ADAS of the driving vehicle 100 based on the information on the lateral acceleration. Therefore, through such an operation, the ADAS control device 200 may not only provide the warning signal about overload to the driver but also control the driving vehicle 100 more effectively by dynamically controlling the degree of control of the ADAS of the driving vehicle 100.

Referring back to FIG. 2, at S500, the ADAS control device 200 may calculate information on the slope on which the driving vehicle is running. The information on the slope refers to information on the slope on which the driving vehicle 100 is traveling, which is obtained by a sensor installed in the driving vehicle 100.

At S600, the ADAS control device 200 may control the adaptive cruise control based on the information on the slope on which the driving vehicle 100 is traveling. As described above, the ADAS control device 200 may determine that the slope on which the driving vehicle 100 is traveling is steep and perform the operations of safely controlling the driving vehicle 100 when the time required to reach the required acceleration, based on the difference between the actual acceleration value and the required acceleration value, significantly exceeds a reference value. Hereinafter, a detailed example of such operations will be described in detail with reference to FIG. 4.

Figure 4:
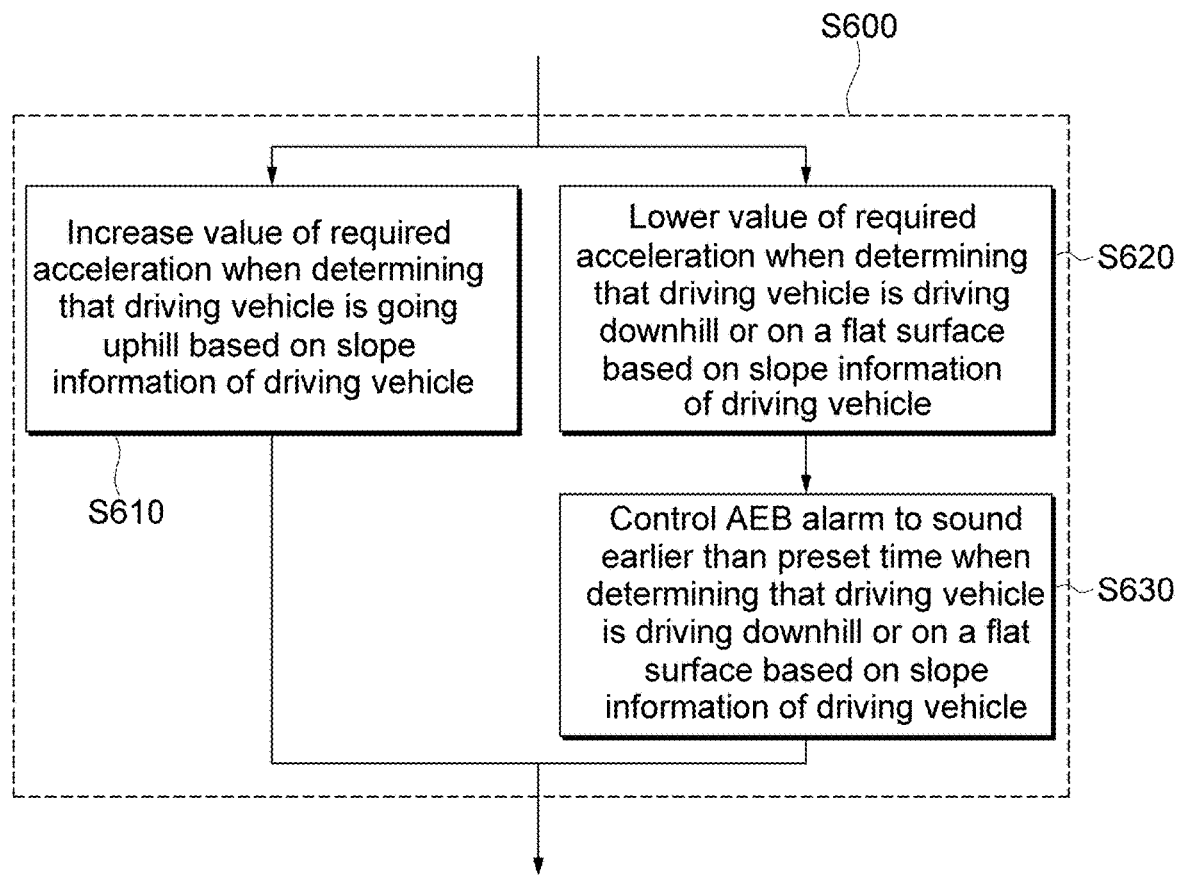
FIG. 4 is a flowchart for illustrating in detail the steps of controlling an adaptive cruise control based on information on the slope on which a driving vehicle is running according to some embodiments of the present disclosure.

FIG. 4 is a flowchart for illustrating in detail the steps of controlling the adaptive cruise control based on the information on the slope on which the driving vehicle is running according to some embodiments of the present disclosure.

At S610, when determining that the driving vehicle 100 is going uphill based on the slope information of the driving vehicle 100, the ADAS control device 200 may increase the value of the required acceleration. Through a sensor installed in the driving vehicle 100, the ADAS control device 200 may determine that the driving vehicle 100 is going uphill based on the slope information of the driving vehicle 100, and may determine that more time is needed to reach the above-mentioned required acceleration and that the driving vehicle 100 is going uphill when the time required to reach the required acceleration exceeds a reference time. Here, the ADAS control device 200 may allow the driving vehicle 100 to run safely by increasing the value of the required acceleration.

At S620, when determining that the driving vehicle 100 is driving downhill or on a flat surface based on the slope information of the driving vehicle 100, the ADAS control device 200 may lower the value of the required acceleration. Through a sensor installed in the driving vehicle 100, the ADAS control device 200 may determine that the driving vehicle 100 is driving downhill or on a flat surface based on the slope information of the driving vehicle 100, and may determine that less time is needed to reach the above-mentioned required acceleration and that the driving vehicle 100 is driving downhill or on a flat surface when the time required to reach the required acceleration is less than a reference time. Here, the ADAS control device 200 may allow the driving vehicle 100 to run safely by lowering the value of the required acceleration.

At S630, when determining that the driving vehicle 100 is driving downhill or on a flat surface based on the slope information of the driving vehicle 100, the ADAS control device 200 may control an AEB alarm to sound earlier than a preset time. When the driving vehicle 100 is driving downhill or on a flat surface, the ADAS control device 200 may control the AEB alarm of the driving vehicle 100 to sound earlier in order to prevent a collision with another vehicle driving ahead. As such, as the AEB alarm is controlled to sound earlier, it may be possible for the occupant of the driving vehicle 100 to control the driving vehicle 100 safely.

Hereinafter, with reference to FIG. 5, an example of a computing device for operating the ADAS control device will be described in detail.

Figure 5:
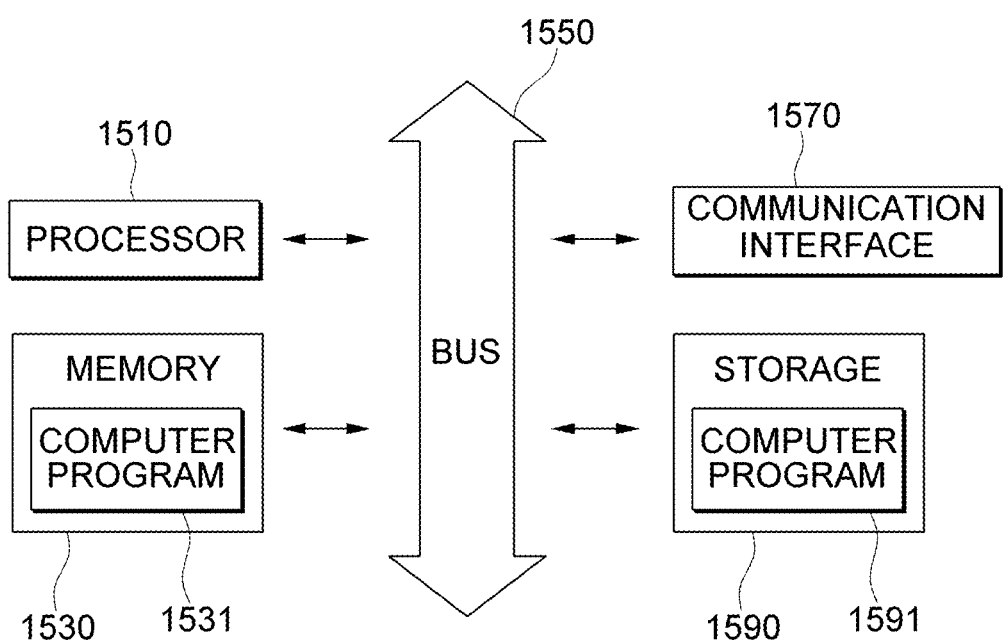
FIG. 5 shows an example of a computing device for operating a device and/or system according to various embodiments of the present disclosure.

FIG. 5 shows an example of a computing device for operating a device and/or system according to various embodiments of the present disclosure.

A computing device 1500 may include at least one processor 1510, a bus 1550, a communication interface 1570, a memory 1530 for loading a computer program 1591 executed by the processor 1510, and a storage 1590 for storing the computer program 1591. However, FIG. 5 only shows the components related to the embodiment of the present disclosure. Therefore, a person having ordinary skill in the art would understand that general-purpose components other than those in FIG. 5 may be further included.

The processor 1510 may control the overall operation of each component of the computing device 1500. The processor 1510 may include a central processing unit (CPU), a micro-processor unit (MPU), a micro controller unit (MCU), a graphic processing unit (GPU), or any type of processor well known in the technical field to which the present disclosure pertains. In addition, the processor 1510 may perform an operation on at least one application or program to carry out the methods according to the embodiments of the present disclosure. The computing device 1500 may include one or more processors.

The memory 1530 may store various data, commands, and/or information. The memory 1530 may load one or more programs 1591 from the storage 1590 to carry out the methods according to the embodiments of the present disclosure. The memory 1530 may be a volatile memory such as a random-access memory (RAM), but the technical scope of the present disclosure is not limited thereto.

The bus 1550 may function as a medium for communication between the components of the computing device 1500. The bus 1550 may be in various forms of an address bus, a data bus, a control bus, etc.

The communication interface 1570 may support a wired/wireless internet communication of the computing device 1500. In addition, the communication interface 1570 may support various communication methods other than the internet communication. Therefore, the communication interface 1570 may include a communication module well known in the technical field to which this disclosure pertains.

According to some embodiments of the present disclosure, the communication interface 1570 may be omitted.

The storage 1590 may non-temporarily store the one or more programs 1591 and various data.

The storage 1590 may include a non-volatile memory such as a read only memory (ROM), an erasable programmable ROM (EPROM), an electrically erasable programmable ROM (EEPROM) and a flash memory, a hard disk, a removable disk, or any type of computer-readable recording medium well known in the technical field to which this disclosure pertains.

When loaded into the memory 1530, the computer program 1591 may include one or more instructions that enable the processor 1510 to perform the methods/operations according to various embodiments of the present disclosure. That is, the processor 1510 may carry out the methods/ operations according to various embodiments of the present disclosure by executing the one or more instructions.

The various embodiments of the present disclosure and the effects of the embodiments have been described above with reference to FIGS. 1 to 5. The effects of the technology of the present disclosure are not limited to the effects mentioned above, and a person having ordinary skill in the art would be able to clearly understand other effects not mentioned above by referring to the description of the present disclosure.

The technology of the present disclosure described with reference to FIGS. 1 to 5 may be in the form of a computer-readable code on a computer-readable medium. The computer-readable recording medium may be, for example, a removable recording medium (e.g., a CD, a DVD, a Blu-ray disk, a USB storage device, and a removable hard disk) or a fixed recording medium (e.g., a ROM, a RAM, and a hard disk included in a computer). The computer program recorded on the computer-readable recording medium can be transmitted to, installed in, and used on another computing device through a network such as the Internet.

Even though all the components of the embodiments of the present disclosure have been described as being combined or operating in combination, the technology of the present disclosure is not necessarily limited to such embodiments. That is, within the scope of the purpose of the present disclosure, all of the components may be selectively combined into one or more components to operate.

Although operations are shown in a specific order in the drawings, the operations do not have to be carried out in that specific order or sequential order, nor do all of the illustrated operations have to be performed to obtain the desired results. In certain situations, multitasking and parallel processing may be more effective. Furthermore, even though various components have been separated in the embodiments described above, it does not mean that they have to be necessarily separated, and the program components and systems, which have been described above, may generally be integrated into a single software product or packaged into multiple software products.

Although the embodiments of the present disclosure have been described above with reference to the attached drawings, a person having ordinary skill in the art to which this disclosure pertains would understand that the present disclosure can be carried out in other specific forms without changing its technology or essential features. Therefore, the embodiments described above should be understood in all respects as illustrative and not restrictive. The scope of the present disclosure should be interpreted in accordance with the claims below, and all technology within the same scope should be construed as being included in the scope of the technology defined by the present disclosure.

What is claimed is:

1. A method of controlling an advanced driver-assistance system (ADAS) of a driving vehicle, comprising:
    calculating a reference time taken to reach a specific acceleration when a predetermined amount of cargo is loaded on the driving vehicle;
    calculating a required acceleration while controlling an adaptive cruise control of the driving vehicle;
    calculating a time for the driving vehicle to reach the required acceleration based on a difference between the required acceleration and an actual acceleration of the driving vehicle;
    transmitting a warning signal about an overload of the driving vehicle resulting from cargo loaded on the driving vehicle to a driver based on a difference between the time and the reference time;
    calculating information on a slope on which the driving vehicle is traveling; and
    controlling the adaptive cruise control based on the information on the slope on which the driving vehicle is traveling.

2. The method of claim 1, wherein the transmitting of the warning signal about the overload of the driving vehicle includes providing the warning signal about the overload of the driving vehicle when the time exceeds a reference value corresponding to the reference time.

3. The method of claim 2, wherein, as the difference between the time and the reference time increases, more warning signals about the overload of the driving vehicle are provided.

4. The method of claim 1, wherein the controlling of the adaptive cruise control based on the information on the slope on which the driving vehicle is traveling includes increasing the required acceleration when the driving vehicle is determined to be going uphill based on the information on the slope.

5. The method of claim 1, wherein the controlling of the adaptive cruise control based on the information on the slope on which the driving vehicle is traveling further includes lowering the required acceleration when the driving vehicle is determined to be going downhill or on a flat surface based on the information on the slope.

6. The method of claim 5, wherein the controlling of the adaptive cruise control based on the information on the slope on which the driving vehicle is traveling further includes controlling an alarm to sound earlier than a preset time when the driving vehicle is determined to be going downhill or on a flat surface based on the information on the slope.

7. The method of claim 6, wherein the controlling of the adaptive cruise control based on the information on the slope on which the driving vehicle is traveling further includes controlling the alarm to sound earlier when the driving vehicle is determined to be going downhill based on the information on the slope, compared to when the driving vehicle is determined to be traveling on a flat surface based on the information on the slope.

8. An advanced driver assistance system (ADAS) control device of a driving vehicle, comprising:
    a processor;
    a network interface;
    a memory; and
    a computer program loaded into the memory and executed by the processor,
    wherein the computer program includes one or more instructions that, when executed by the processor, cause the processor to:
    calculate a reference time taken to reach a specific acceleration when a predetermined amount of cargo is loaded on the driving vehicle;
    calculate a required acceleration while controlling an adaptive cruise control of the driving vehicle;
    calculate a time for the driving vehicle to reach the required acceleration based on a difference between the required acceleration and an actual acceleration of the driving vehicle;
    transmit a warning signal about an overload of the driving vehicle resulting from cargo loaded on the driving vehicle to a driver based on a difference between the time and the reference time;
    calculate information on a slope on which the driving vehicle is traveling; and control the adaptive cruise control based on the information on the slope on which the driving vehicle is traveling.

9. The device of claim 8, wherein, when executing the instructions, the processor provides the warning signal about the overload of the driving vehicle to the driver when the time exceeds a reference value corresponding to the reference time.

10. The device of claim 9, wherein, as the difference between the time and the reference time increases, more warning signals about the overload of the driving vehicle are provided.

11. The device of claim 8, wherein, when executing the instructions, the processor increases the required acceleration when the driving vehicle is determined to be going uphill based on the information on the slope.

12. The device of claim 8, wherein, when executing the instructions, lowering the processor lowers the required acceleration when the driving vehicle is determined to be going downhill or on a flat surface based on the information on the slope.

13. The device of claim 12, wherein, when executing the instructions, the processor controls an alarm to sound earlier than a preset time when the driving vehicle is determined to be going downhill or on a flat surface based on the information on the slope.

14. The device of claim 13, wherein, when executing the instructions, the processor controls the alarm to sound earlier when the driving vehicle is determined to be going downhill based on the information on the slope, compared to when the driving vehicle is determined to be traveling on a flat surface based on the information on the slope.

* * * * *